United States Patent [19]

Furukawa

[11] Patent Number: 4,791,869
[45] Date of Patent: Dec. 20, 1988

[54] PHASE ADJUSTING APPARATUS FOR SHEET-FED PRINTING PRESS

[75] Inventor: Shigeo Furukawa, Higashikatsushika, Japan

[73] Assignee: Komori Printing Machinery Co., Ltd., Tokyo, Japan

[21] Appl. No.: 126,278

[22] Filed: Nov. 30, 1987

[51] Int. Cl.$^4$ ............................................. B41F 7/06
[52] U.S. Cl. ..................................... 101/232; 474/900
[58] Field of Search ................ 198/813, 814; 474/900, 474/138; 101/232

[56] References Cited

U.S. PATENT DOCUMENTS

| 1,819,743 | 8/1931 | Duncan | 474/900 X |
| 3,166,947 | 1/1965 | Hendershot | 474/900 X |
| 4,321,869 | 3/1982 | Jeschke et al. | 474/900 X |

FOREIGN PATENT DOCUMENTS

| 82844 | 6/1980 | Japan | 474/900 |
| 178042 | 10/1983 | Japan | 474/900 |

OTHER PUBLICATIONS

Chironis; *Mechanisms Linkages and Mechanical Controls* p. 102, "Adjustable Stroke Mechanisms", 1965, Scientific Library.

Primary Examiner—Clifford D. Crowder
Attorney, Agent, or Firm—Charles E. Pfund

[57] ABSTRACT

In a phase adjusting apparatus for a sheet-fed printing press for adjusting a relative phase in a rotational direction between a paper sheet feeder and a printing apparatus which are coupled through a chain, a sprocket is in internal contact with a tension side of the chain and is axially supported by a slide base. The slide base is supported to be movable in a direction substantially perpendicular to an extension direction of the tension side of the chain. A slide base driving apparatus is arranged on a press frame. A tension sprocket which is biased in a tension direction of the chain by compression coil springs so as to be in contact with a slack side of the chain.

3 Claims, 3 Drawing Sheets

PHASE ADJUSTING APPARATUS FOR SHEET-FED PRINTING PRESS

BACKGROUND OF THE INVENTION

The present invention relates to a phase adjusting apparatus for adjusting a relative phase between a paper sheet feeder and a printing apparatus in accordance with a paper feed state for the printing press in a sheet-fed printing press.

In a sheet-fed printing press, paper sheets stacked on a stack board are drawn by suction from an uppermost sheet by a sheet pick-up device one by one, and are fed onto a feedboard through a feeder board. Thereafter, the sheet is gripped and conveyed by grippers of a swing gripper. The sheet is subjected to printing while being gripped and conveyed by grippers of a plate cylinder of the printing apparatus.

In such a sheet-fed printing press, rotation of a motor is transmitted to a printing apparatus, and is then transmitted to the sheet pick-up device of the paper sheet feeder or a paper convey tape provided on the feeder board through a chain or a line shaft. If a rotational phase between the paper sheet feeder and the printing apparatus is fixed at a given value, when the tape is extended or is slid along a paper sheet, the sheet cannot be fed to the printing apparatus at a predetermined timing. Thus, grippers may fail to grip the sheet or may unsatisfactorily grip it, resulting in printing error or trouble which causes the printing press to be stopped. In order to prevent this, a phase adjusting apparatus cooperating with elongated holes and bolts is provided at any location in a driving system between the printing apparatus and the paper sheet feeder. If an abnormality is found upon observation of the gripping state of the grippers, the sheet feed timing of the paper sheet feeder is advanced or delayed with respect to the printing apparatus.

However, the conventional phase adjusting apparatus cannot be operated during operation of a printing press, and adjustment must be performed after the printing press is stopped. Therefore, workability is degraded, and an operator cannot perform adjustment while observing the gripping state of the grippers. Therefore, appropriate adjustment cannot be achieved the first time, and readjustment must be repeated several times. Therefore, an idle time is prolonged, and the number of wasted paper sheets is increased. Another conventional phase adjusting apparatus which can be adjusted during the operation of the printing press and adopts planetary gears in a driving system between the printing apparatus and the paper sheet feeder is proposed. However, this apparatus has a complicated structure, and a distance between the shafts of the gears must be changed. Therefore, backlash of the gears is increased, thus unstabilizing phase.

SUMMARY OF THE INVENTION

It is a principal object of the present invention to provide a phase adjusting apparatus for a sheet-fed printing press which can improve productivity with a small amount of wasted paper.

It is another object of the present invention to provide a phase adjusting apparatus for a sheet-fed printing press which allows easy, quick phase adjustment.

It is still another object of the present invention to provide a phase adjusting apparatus for a sheet-fed printing press which is free from the influence of backlash of gears and can stabilize phase and ccpe with a wide range of change in phase.

In order to achieve the above objects, there is provided a phase adjusting apparatus for a sheet-fed printing press for adjusting relative phase in a rotational direction between a paper sheet feeder and a printing apparatus which are coupled through a chain, comprising a frame, a sprocket which is in contact with the chain from the inside toward a tension side of the chain, a slide member, mounted on the frame through rails, for supporting the sprocket through a short shaft such that the slide member is movable along the longitudinal direction corresponding to a direction perpendicular to an extension direction of the tension side of the chain, slide member driving means for moving the slide member in the longitudinal direction, and a tension sprocket supported on the slide member through a short shaft and in contact with the chain from the inside toward a slack side of the chain, the tension sprocket being biased by a spring member so that the chain is tensioned.

BRIEF DESCRIPTION OF THE DRAWINGS

FIGS. 1 to 3 show an embodiment of a phase adjusting apparatus of a sheet-fed printing press according to the present invention, in which:

FIG. 1 is a side view of a chain driving apparatus to which the present invention is applied;

FIG. 2 is a partially cutaway sectional view taken along a line A—A of FIG. 1; and FIG. 3 is a partially cutaway plan view when viewed from a direction B of FIG. 1.

DESCRIPTION OF THE PREFERRED EMBODIMENT

An embodiment of the present invention will be described with reference to the accompanying drawings.

Figure 1:
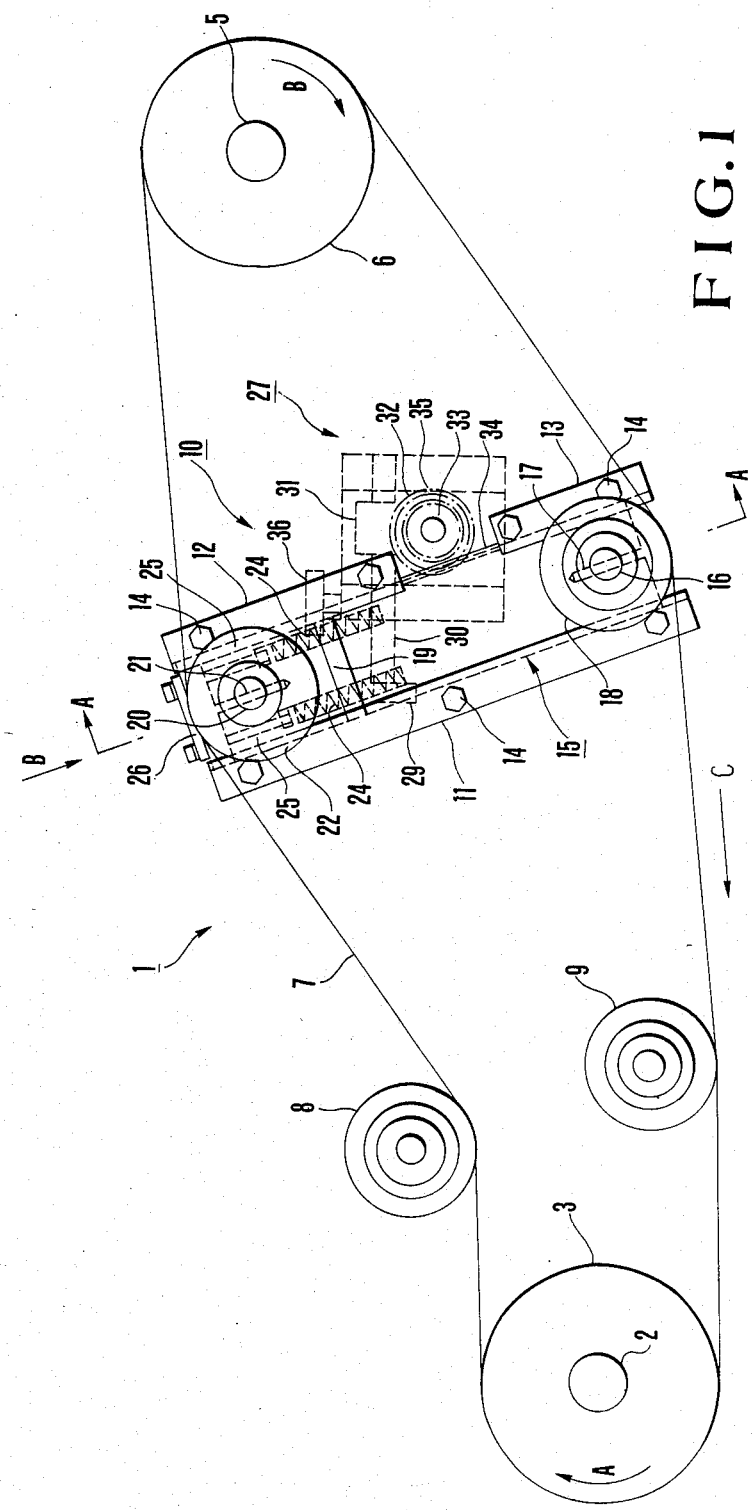
Figure 2:
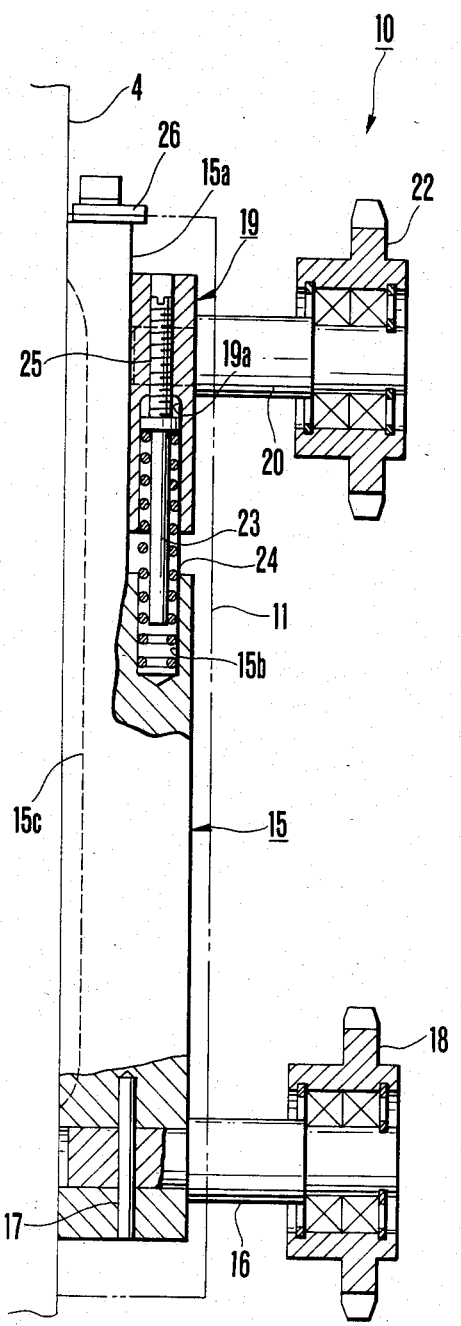
Figure 3:
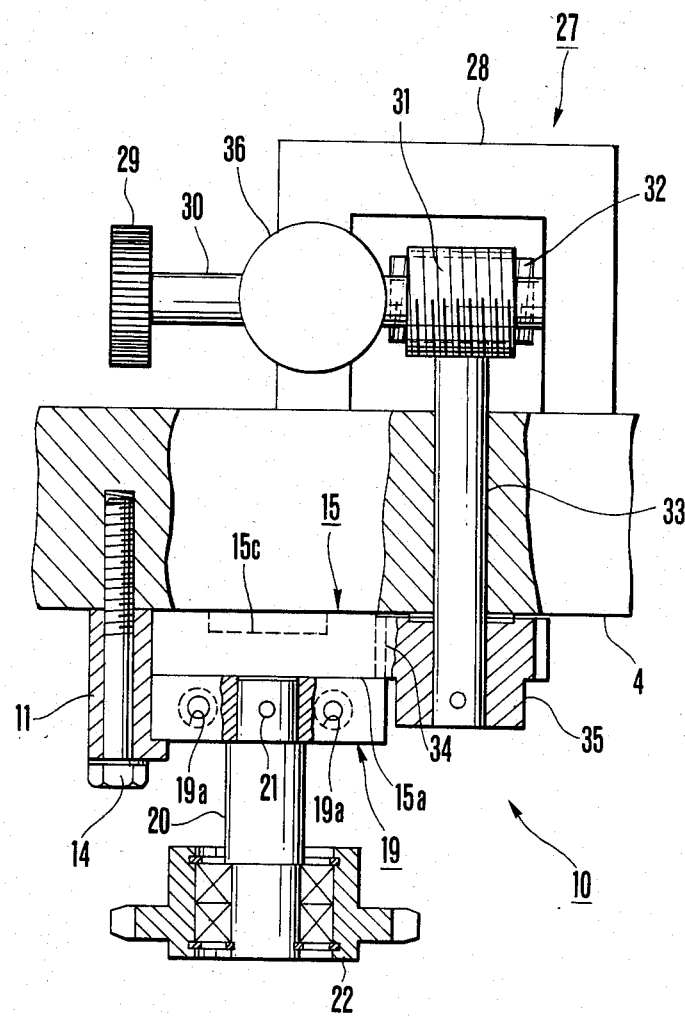

In FIGS. 1 to 3, a driving sprocket 3 is axially fitted, near a frame 4, on a driving shaft 2 of a printing apparatus and serves as a driving section of a chain driving apparatus 1. A driven sprocket 6 is axially fitted, near the frame 4, on a driven shaft 5 of a paper sheet feeder and serves as a driven section. A chain 7 is looped between the driving sprocket 3 and the driven sprocket 5. When the driving sprocket 3 is rotated in a direction indicated by an arrow A, the driven sprocket 6 is rotated in a direction indicated by an arrow B, and the chain 7 travels in a direction indicated by an arrow C. Therefore, the lower side (FIG. 1) of the chain 7 corresponds to a tension side, and the upper side thereof corresponds to a slack side. Tension sprockets 8 and 9 which are supported by the frame 4 and fixed to shafts are respectively in contact with the tension and slack sides of the chain 7 near the driving sprocket 3.

A phase adjusting apparatus generally denoted by reference numeral 10 is arranged between the tension sprockets 8 and 9 and the driven sprocket 6. More specifically, a guide rail 11 substantially perpendicular to a line connecting the centers of the shafts 2 and 5, and guide rails 12 and 13 which are divided in a longitudinal direction and parallel to the guide rail 11 are fixed to the inner surface of the frame 4 by bolts 14. Reference numeral 15 denotes a strip slide base as a slide member which is formed to be movable to the tension and slack sides such that the upper and lower surfaces are slidable along the flange portions of the guide rails 11, 12, and 13 and the inner surface of the frame 4. A short shaft 16 is fixed to the lower end portion of the slide base 15 by a stop 17. A sprocket 18 which is in internal contact with the tension side of the chain 7 is rotatably fitted on the short shaft 16. A thin-walled portion 15a having a thickness half that of the slide base 15 is formed in the upper portion of the slide base 15. A rectangular slide block 19 is supported to be movable to the tension and slack sides such that its upper and lower surfaces are in slidable contact with the inner surface of the thin-walled portion 15a and the flange surfaces of the slide guides 11 and 12. A short shaft 20 is fixed at the central portion in the widthwise direction of the slide block 19 by a stop 21. A tension sprocket 22 which is in internal contact with the slack side of the chain 7 is rotatably fitted on the short shaft 20. Furthermore, a pair of stepped spring holes 19a vertically extend through the slide block 19. Spring holes 15b are also formed in the slide base 15 so as to correspond to the spring holes 19a. Compression coil springs 24 are interposed between collars of spring shafts 23 inserted in the spring holes 19a and the bottom surfaces of the spring holes 15b, respectively. The compression coil springs 24 accumulate a biasing force in a direction for separating the slide block 19 from the slide base 15 by adjusting screws 25 threadably engaged in threaded portions of the spring holes 19a. More specifically, the tension sprocket 22 is biased in a direction for tensioning the slack side of the chain 7 by the compression coil springs 24. The biasing force can be adjusted by forward or backward movement of each adjusting screw 25. Reference numeral 26 denotes a stopper for the slide block 19, which is fixed to the upper end face of the slide base 15 by bolts; and 15c, a sliding grease groove between the slide base 15 and the frame 4.

Reference numeral 27 generally denotes a driving apparatus for moving the slide base 15 to the slack or tension side. The driving apparatus 27 comprises a U-shaped bracket 28 fixed outside the frame 4 at a position corresponding to a divided portion between the guide rails 12 and 13. An operating shaft 30 with a knob 29 parallel to the frame 4 is pivotally supported on the bracket 28. A worm 31 is axially fitted on the operating shaft 30. A driving shaft 33 having a worm wheel 32 which is meshed with the worm 31 is pivotally fitted on the frame 4. A pinion 35 meshed with a rack 34 formed on the slide base 15 is fixed to the other end of the driving shaft 33. With this structure, when the operating shaft 30 is pivoted, the driving shaft 33 is pivoted via meshing between the worm 31 and the worm wheel 32, and the sprocket 18 is moved to the slack or tension side together with the slide base 15 upon meshing between the pinion 35 and the rack 34. Then, a phase between the driving shaft 2 and the driven shaft 5 is adjusted in accordance with expansion/constriction of the tension side of the chain 7. Reference numeral 36 denotes a set screw which is screwed in the screw hole of the bracket 28 to fix the pivotal movement of the operating shaft 30 at the adjusted position.

The operation of the phase adjusting apparatus with the above structure will be described. The driving shaft 2 is driven and rotated by a motor side, so that respective cylinders of the printing apparatus are rotated and grippers are opened/closed. Rotation of the driving shaft 2 is transmitted to the driven shaft 5 through the chain 7, and paper suction in the paper sheet feeder, paper conveyance by a convey tape, and the like are performed. Tensile forces by the tension sprockets 8, 9, and 22, and the sprocket 18 act on the chain 7. For example, when the convey tape and a paper sheet slip relative to each other in the paper sheet feeder and a feed timing of a paper sheet to the printing apparatus is delayed, the set screw 36 is loosened, and then, the operator turns the operating shaft 30 while holding the knob 29 during the operation of a printing press. Then, the driving shaft 33 is pivoted through the worm 31 and the worm wheel 32, and the sprocket 19 is moved downward in FIG. 1 together with the slide base 15 through the pinion 35 and the rack 34. In this case, a force for moving the sprocket 18 by the driving apparatus 27 overcomes the biasing force of the compression coil springs 24. Therefore, although the total length of the chain 7 is kept unchanged, the length of the tension side of the chain 7 becomes larger than that of the slack side. More specifically, assuming the driving shaft 2 is fixed in position, the driven shaft 5 is slightly pivoted in the direction indicated by the arrow B, and the phase of the driven shaft 5 is advanced with respect to the driving shaft 2. Therefore, the phase of the paper sheet feeder is advanced with respect to the printing apparatus, and a paper feed timing for the printing apparatus which has been delayed due to paper slippage can be advanced, thus resuming the operation at a normal timing. Note that the tension sprockets 8 and 9 are fixed to the shafts, and are simply rotated at identical positions. After phase adjustment, the set screw 36 is tightened so as not to change a phase. The operator can perform the above operation during the operation of the printing press while observing the paper feed state for the printing apparatus.

Note that if the chain 7 is elongated due to long-term use to result in an increase in total length thereof, and a phase of the driven shaft 5 is delayed with respect to the driving shaft 2, the normal phase can be obtained by the same operation as described above. In this embodiment, the tension sprocket 22 is arranged along a line substantially perpendicular to the chain 7 while it is biased against the sprocket 18 by the compression coil springs 24. For example, the tension sprocket 22 may be independently arranged to be separated from the sprocket 18 and to be located at, e.g., a position of the tension sprocket 8.

As can be understood from the above description, according to the present invention, a slide member with a sprocket which is in internal contact with a tension side of a chain for coupling a paper sheet feeder and a printing apparatus in a sheet-fed printing press, is provided. The slide member is supported to be movable in a direction substantially perpendicular to an extension direction of the tension side of the chain. An operating means is provided to a press frame, and a chain sprocket is arranged which is biased in a tension direction of the chain by a spring member so as to be in contact with the slack side of the chain. Thus, when a phase between the paper sheet feeder and the printing apparatus is changed due to slippage between a sheet and a convey tape or elongation of the chain, it can be adjusted by operating the operating means during the operation. Therefore, productivity can be improved, and the number of wasted paper sheets can be reduced. In addition, since adjustment can be performed while observing a sheet feed state, adjustment can be quickly and appropriately performed. Since no planetary gears are used unlike in a conventional apparatus, a phase is free from back-rush and is stabilized, and an amount of adjustment can be increased, thus coping with a wide range of a change in phase.

What is claimed is:

1. A phase adjusting apparatus for a sheet-fed printing press for adjusting a relative phase in a rotational direction between a paper sheet feeder and a printing apparatus which are coupled through a chain, comprising:
   a frame;
   a sprocket which is in contact with said chain from the inside toward a tension side of said chain;
   a slide member, mounted on said frame through rails, for supporting said sprocket through a short shaft such that said slide member is movable along the longitudinal direction corresponding to a direction perpendicular to an extension direction of the tension side of said chain;
   slide member driving means for moving said slide member in the longitudinal direction wherein said slide member comprises a thin-walled portion at an upper portion thereof, a slide block having stepped screw holes, spring pins fitted in said stepped screw holes, and adjusting screws threadably engaged with said stepped holes and engaging with upper ends of said spring pins, said spring pins being surrounded by said spring members; and
   a tension sprocket supported on said slide member through a short shaft and in contact with said chain from the inside toward a slack side of said chain, said tension sprocket being biased by a spring member so that the chain is tensioned.

2. An apparatus according to claim 1, wherein said slide member driving means comprises an operation shaft with a knob, a worm mounted on said operating shaft, a worm wheel meshed with said worm, a drive shaft one end of which is coupled to said worm wheel, a drive shaft coupled to the other end of said drive shaft, a rack formed on said slide member and meshed with said pinion, so that said slide member is moved through said operation shaft, said worm, said worm wheel, said drive shaft, said pinion, and said rack along the longitudinal direction upon rotation of said knob.

3. An apparatus according to claim 2, wherein a longitudinal direction of said slide member is substantially perpendicular to a line connecting axes of driving and driven sprockets.

* * * * *